US012608225B2

(12) United States Patent
Zhu et al.

(10) Patent No.: US 12,608,225 B2
(45) Date of Patent: Apr. 21, 2026

(54) HIERARCHICAL PROGRAMMING MODEL FOR ARTIFICIAL INTELLIGENCE HARDWARE

(71) Applicant: Microsoft Technology Licensing, LLC, Redmond, WA (US)

(72) Inventors: Haishan Zhu, Bellevue, WA (US); Eric S. Chung, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 601 days.

(21) Appl. No.: 17/942,039

(22) Filed: Sep. 9, 2022

(65) Prior Publication Data

US 2024/0086233 A1     Mar. 14, 2024

(51) Int. Cl.
| | |
|---|---|
| *G06F 9/48* | (2006.01) |
| *G06F 9/30* | (2018.01) |
| *G06F 9/445* | (2018.01) |
| *G06F 9/50* | (2006.01) |
| *G06F 9/52* | (2006.01) |

(52) U.S. Cl.
CPC .......... *G06F 9/4881* (2013.01); *G06F 9/3004* (2013.01); *G06F 9/44505* (2013.01); *G06F 9/5066* (2013.01); *G06F 9/52* (2013.01); *G06F 2209/5017* (2013.01); *G06F 2209/5018* (2013.01)

(58) Field of Classification Search
None
See application file for complete search history.

(56) References Cited

U.S. PATENT DOCUMENTS

| | | | | |
|---|---|---|---|---|
| 11,855,849 | B1* | 12/2023 | Davis | G06N 5/046 |
| 11,900,156 | B2* | 2/2024 | Etsion | G06F 9/5027 |
| 2003/0065701 | A1* | 4/2003 | Uner | G06F 9/5027 |
| | | | | 718/102 |
| 2009/0070773 | A1* | 3/2009 | Depoutovitch | G06F 9/5027 |
| | | | | 718/106 |
| 2010/0269110 | A1* | 10/2010 | Leijen | G06F 9/505 |
| | | | | 718/100 |
| 2015/0058857 | A1* | 2/2015 | Sandstrom | G06F 9/5038 |
| | | | | 718/107 |
| 2015/0169369 | A1* | 6/2015 | Baskaran | G06F 9/4881 |
| | | | | 718/102 |
| 2018/0285414 | A1* | 10/2018 | Kondiles | G06F 9/505 |
| 2018/0307603 | A1 | 10/2018 | Che | |
| 2021/0092069 | A1* | 3/2021 | Musleh | H04L 47/2441 |
| 2021/0294673 | A1* | 9/2021 | Edwards | G06F 9/3009 |

(Continued)

OTHER PUBLICATIONS

International Search Report and Written Opinion received for PCT Application No. PCT/US2023/028309, mailed on Nov. 8, 2023, 17 pages.

*Primary Examiner* — Abu Zar Ghaffari

(74) *Attorney, Agent, or Firm* — Holzer Patel Drennan

(57) ABSTRACT

A system includes a set of lower-level control threads. The system also includes a higher-level control thread configured to receive a command from a device, generate a set of commands based on the command, and provide the set of commands to a subset of the set of lower-level control threads. A lower-level control thread in the subset of the set of lower-level control threads is configured to instruct, based on a particular command in the set of commands, a subset of a plurality of processing threads to perform a set of operations.

19 Claims, 6 Drawing Sheets

100

(56) References Cited

U.S. PATENT DOCUMENTS

| | | | |
|---|---|---|---|
| 2022/0058053 A1* | 2/2022 | Andrei | G06N 3/08 |
| 2022/0357742 A1* | 11/2022 | Appu | G06N 3/045 |
| 2023/0140937 A1* | 5/2023 | Gross | C12Q 1/6869 |
| | | | 702/19 |

* cited by examiner

400

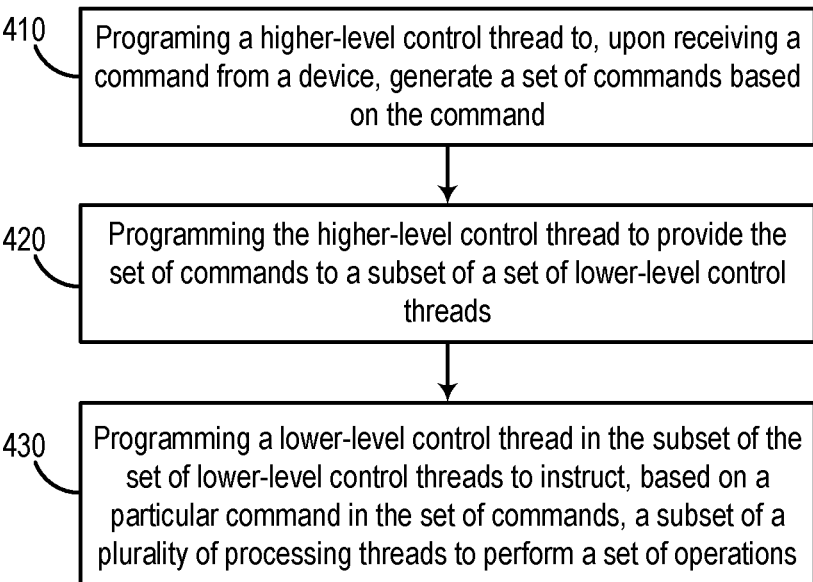

410 — Programing a higher-level control thread to, upon receiving a command from a device, generate a set of commands based on the command 420 — Programming the higher-level control thread to provide the set of commands to a subset of a set of lower-level control threads 430 — Programming a lower-level control thread in the subset of the set of lower-level control threads to instruct, based on a particular command in the set of commands, a subset of a plurality of processing threads to perform a set of operations

*FIG. 4*

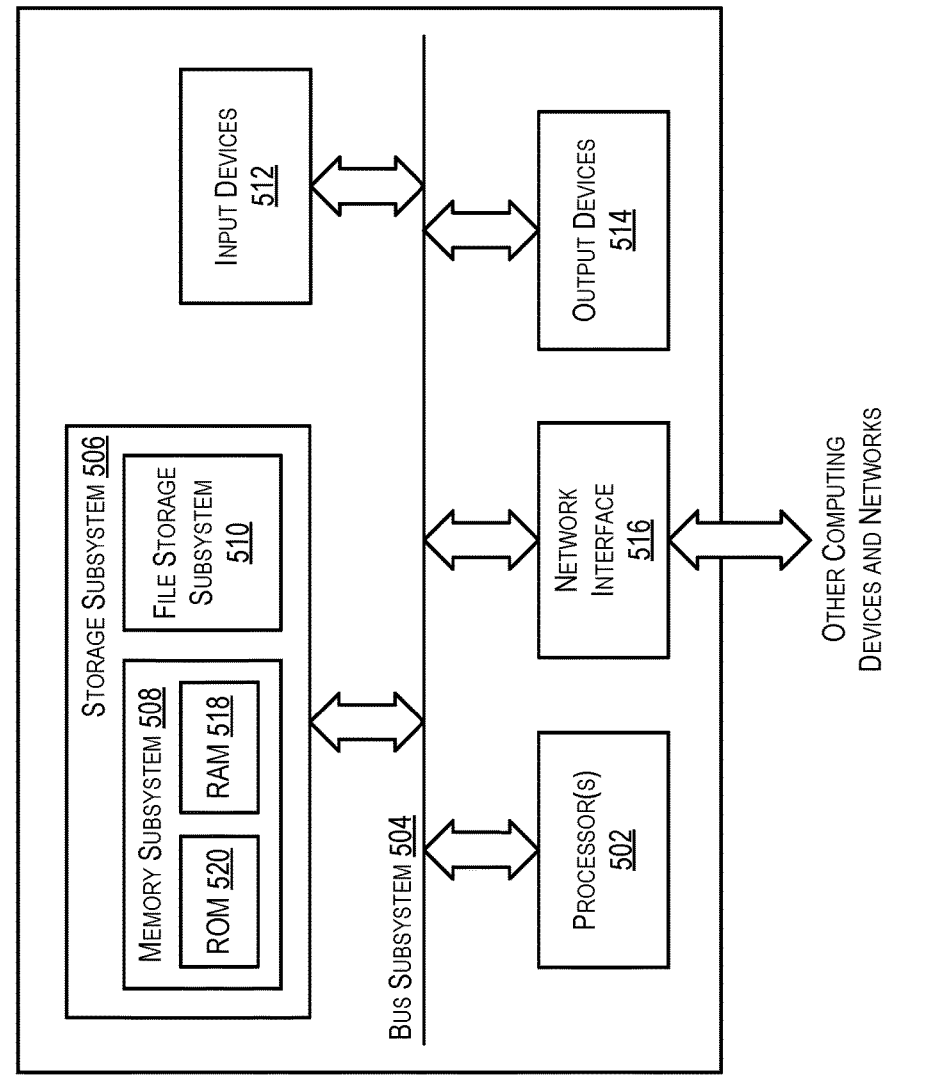
*FIG. 5*

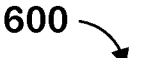
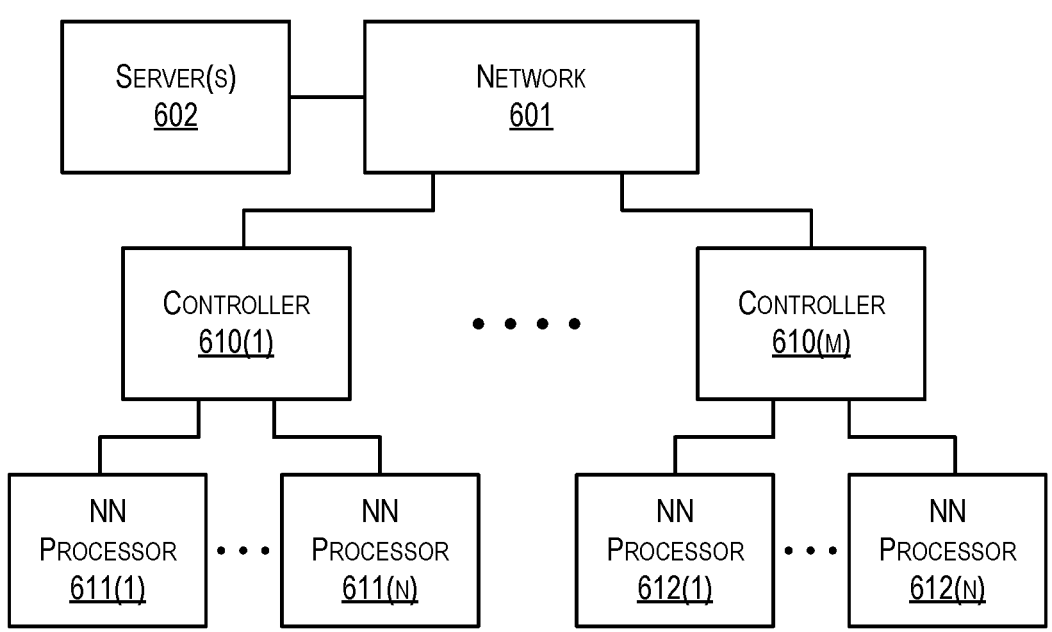
*FIG. 6*

HIERARCHICAL PROGRAMMING MODEL FOR ARTIFICIAL INTELLIGENCE HARDWARE

BACKGROUND

The present disclosure relates to artificial intelligence (AI). More particularly, the present disclosure relates to techniques for programming AI hardware used for training and inference.

A neural network is a machine learning model used for a variety of different applications (e.g., image classification, computer vision, natural language processing, speech recognition, writing recognition, etc.). A neural network may be trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

FIG. 4 illustrates a process for programming AI hardware according to some embodiments.

FIG. 5 depicts a simplified block diagram of an example computer system according to some embodiments.

FIG. 6 illustrates a neural network processing system according to some embodiments.

DETAILED DESCRIPTION

Figure 1:
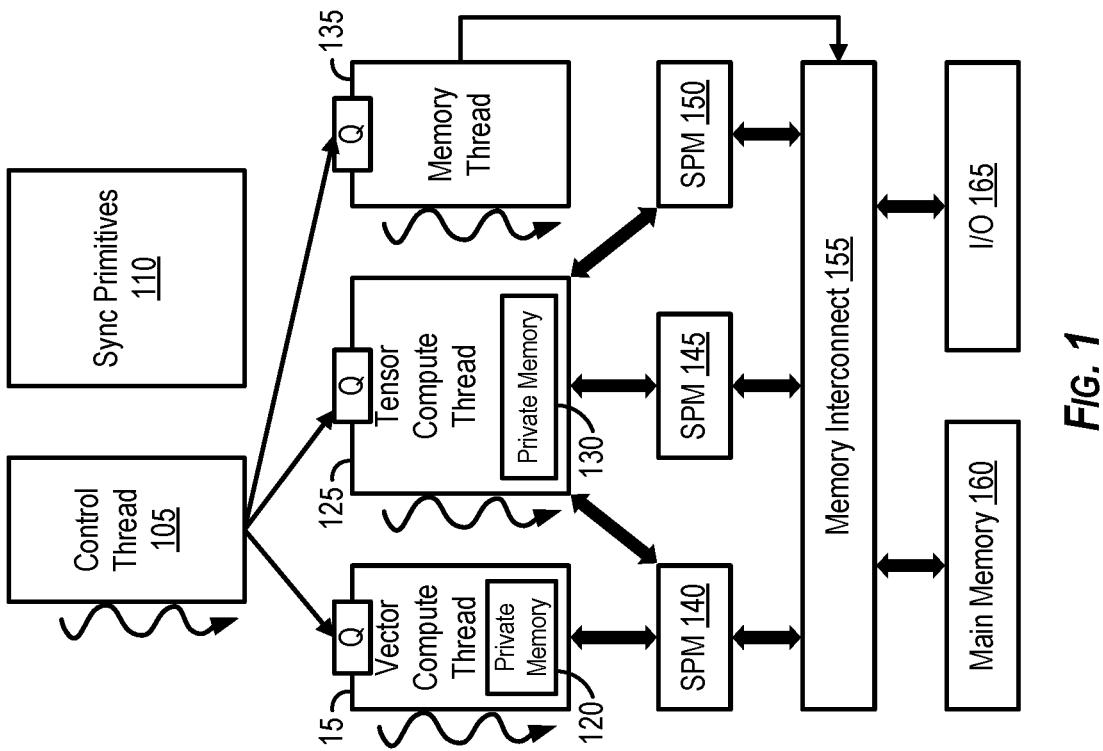
FIG. 1 illustrates an architecture for a one-level control hierarchy according to some embodiments.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for providing a hierarchical programming model for AI hardware. In some embodiments, an architecture for the programming model includes a hierarchy of control threads. The hierarchy of control threads may include any number of different levels. At each level of the hierarchy, each control thread may send commands and parameters asynchronously to lower-level control threads. The lowest level of the hierarchy has one or more workgroups that each include a set of threads and shared memories. A workgroup may perform data computations and move data. A user may program the architecture to perform various different tasks. For example, a user can program the architecture to train neural networks and use trained neural networks for inference. Employing a hierarchical control structure provides better scalability compared to multithread programming with a flat control hierarchy.

In some embodiments, a thread is a static hardware execution context. Each thread may include private states.

Examples of private states include a command queue, a program counter, private memories, register files, etc. In some cases, a thread can receive commands in a queue and execute the commands in the order that the thread receives them. In some embodiments, the execution of each thread is asynchronous with respect to other threads (unless explicit synchronization is specified by the program). Threads can be heterogeneous in the sense that the definition of thread-private states and control mechanisms can differ between threads.

Many different types of threads may be utilized in an architecture for the programming model. Examples of such types of threads include control threads, compute threads, and memory threads. In some instances, compute threads and memory threads are referred to collectively as processing threads. In some embodiments, a control thread is configured to send commands to compute threads, memory threads, or lower-level control threads. A compute thread can be configured to perform a set of data computation operations (e.g., matrix multiplication operations, element-wise operations, etc.). A memory thread may be configured to perform memory operations (e.g., reading data from memory, writing data to memory, etc.) and/or perform data transformation operations (e.g., matrix transpose operations, gather and scatter operations, data type and layout changes, etc.).

FIG. 1 illustrates an architecture 100 for a one-level control hierarchy according to some embodiments. In some embodiments, architecture 100 is implemented on a device (e.g., an AI accelerator). As shown, architecture 100 includes control thread 105, synchronization primitives 110, vector compute thread 115, tensor compute thread 125, memory thread 135, shared partitioned memory (SPM) 140, SPM 145, SPM 150, memory interconnect 155, main memory 160, and input/output (I/O) interface 165. In some embodiments, architecture 100 is implement in hardware (e.g., field programmable gate arrays (FPGAs), application specific integrated circuits (ASICs), etc.) while, in other embodiments, architecture 100 is implement in software. In yet some embodiments, architecture 100 is implemented by a mix of hardware and software. For instance, in some such embodiments, control thread 105 and vector thread 115 may run on programmable processors (e.g., conventional central processing units (CPUs) and/or vector processors) while tensor compute thread and memory thread may run on custom hardware processors.

Control thread 105 is responsible for controlling vector compute thread 115, tensor compute thread 125, and memory thread 135. For example, when control thread 105 receives a particular command (e.g., from a processor included in a device on which architecture 100 is implemented, from another device, etc.), control thread 105 determines a set of commands for implementing the particular command and then generates the set of commands. Next, control thread 105 sends the set of commands to one or more of vector compute thread 115, tensor compute thread 125, and memory thread 135 via their respective queues. As an example, control thread 105 can send vector-related commands in the set of commands to vector compute thread 115, tensor-related commands in the set of commands to tensor compute thread 125, and memory-related commands in the set of commands to memory thread 135. In some embodiments, the structure of the commands that control thread 105 determines for each of the vector compute thread 115, tensor compute thread 125, and memory thread 135 may be different and suitable for their respective purposes.

Synchronization primitives 110 provides mechanisms for providing synchronization between vector compute thread 115, tensor compute thread 125, memory thread 135, and main memory 160. For instance, synchronization primitives 110 can be used for producer-consumer relationships between threads, specifying ordered access to SPM 140, SPM 145, SPM 150, and/or main memory 160 by vector compute thread 115, tensor compute thread 125, and/or memory thread 135, communication over a network with remote devices (e.g., AI accelerators, hosts, etc.), multi-workgroup barriers, debugging breakpoints, etc. Examples of mechanisms for providing synchronization include semaphores, mutexes, monitors, and/or barriers. Methods for implementing synchronization can include point-to-point messages between threads, shared semaphore register banks, and atomic operation. In some embodiments, vector compute thread 115, tensor compute thread 125, and memory thread 135 execute asynchronously. As such, in some such embodiments, when a user wants to synchronize vector compute thread 115, tensor compute thread 125, and/or memory thread 135 when creating a program for execution by architecture 100, the user explicitly specifies the use of synchronization primitives 110 in the program.

Vector compute thread 115 is configured to perform vector operations. That is, vector compute thread 115 can be configured to perform element-wise operations, which are operations that are applied to each and every element in a vector. As shown, vector compute thread 115 includes a queue (Q) through which vector compute thread 115 receives commands from control thread 105. As such, when vector compute thread 115 receives a command in its queue from control thread 105, vector compute thread 115 executes the command. In some embodiments, vector compute thread 115 can be programmed to implement a particular command in different ways. Vector compute thread 115 also includes private memory 120. In some embodiments, private memory 120 is accessible by only vector compute thread 115 and cannot be access by tensor compute thread 125 and memory thread 135. That is, moving data to and from private memory 120 is initiated by only vector compute thread 115. In some cases, when vector compute thread 115 executes a command, it may involve vector compute thread 115 accessing private memory 120 and/or SPM 140.

Tensor compute thread 125 performs tensor operations. An example of tensor operations includes matrix multiplication operations. As depicted in FIG. 1, tensor compute thread 125 includes a queue (Q) through which tensor compute thread 125 receives commands from control thread 105. Hence, when tensor compute thread 125 receives a command in its queue from control thread 105, tensor compute thread 125 executes the command. In some embodiments, tensor compute thread 125 can be programmed to implement a particular command in different ways. In addition, tensor compute thread 125 includes private memory 130. In some embodiments, private memory 130 is accessible by only tensor compute thread 125 and cannot be access by vector compute thread 115 and memory thread 135. In other words, moving data to and from private memory 120 is initiated by only tensor compute thread 125. In some instances, when tensor compute thread 125 executes a command, it may involve tensor compute thread 125 accessing private memory 130, SPM 140, SPM 145, and/or SPM 150.

Memory thread 135 is configured to perform memory operations, perform data transformation operations, and facilitate communication of data with other devices. Examples of memory operations include reading data from SPM 140, SPM 145, SPM 150, main memory 160, and/or I/O interface 165 as well as writing data to SPM 140, SPM 145, SPM 150, main memory 160, and/or I/O interface 165. Examples of data transformation operations include matrix transpose operations, gather and scatter operations, data type and layout changes, etc. Memory thread 135 can facilitate communication of data with other devices by receiving data from and sending data to I/O interface 165. As illustrated, memory thread 135 includes a queue (Q) through which memory thread 135 receives commands from control thread 105. Accordingly, when memory thread 135 receives a command in its queue from control thread 105, memory thread 135 executes the command. In some embodiments, memory thread 135 may be programmed to implement a particular command in different ways. In some instances, when memory thread 135 executes a command, it may involve memory thread 135 accessing, via memory interconnect 155, SPM 140, SPM 145, SPM 150, main memory 160, and/or I/O interface 165.

Each of SPM 140, SPM 145, and SPM 150 is a shared partitioned memory. In some embodiments, a shared partitioned memory is memory that can be accessed by one or more threads and may have affinity to some threads. One example of a shared partition memory include is a scratchpad memory that for passing results between worker threads without going into main memory. Another example of a shared partitioned memory is a tensor compute thread output memory that can be directly accessed by a vector compute thread. Each of SPM 140, SPM 145, and SPM 150 are accessible by vector compute thread 115, tensor compute thread 125, and memory thread 135. Memory interconnect 155 provides access to SPM 140, SPM 145, SPM 150, and main memory 160. Main memory 160 is memory used by architecture 100 for storing data. I/O interface 165 is an interface for accessing external I/O devices (e.g., a network interface, a component bus interface, etc.).

Figure 2:
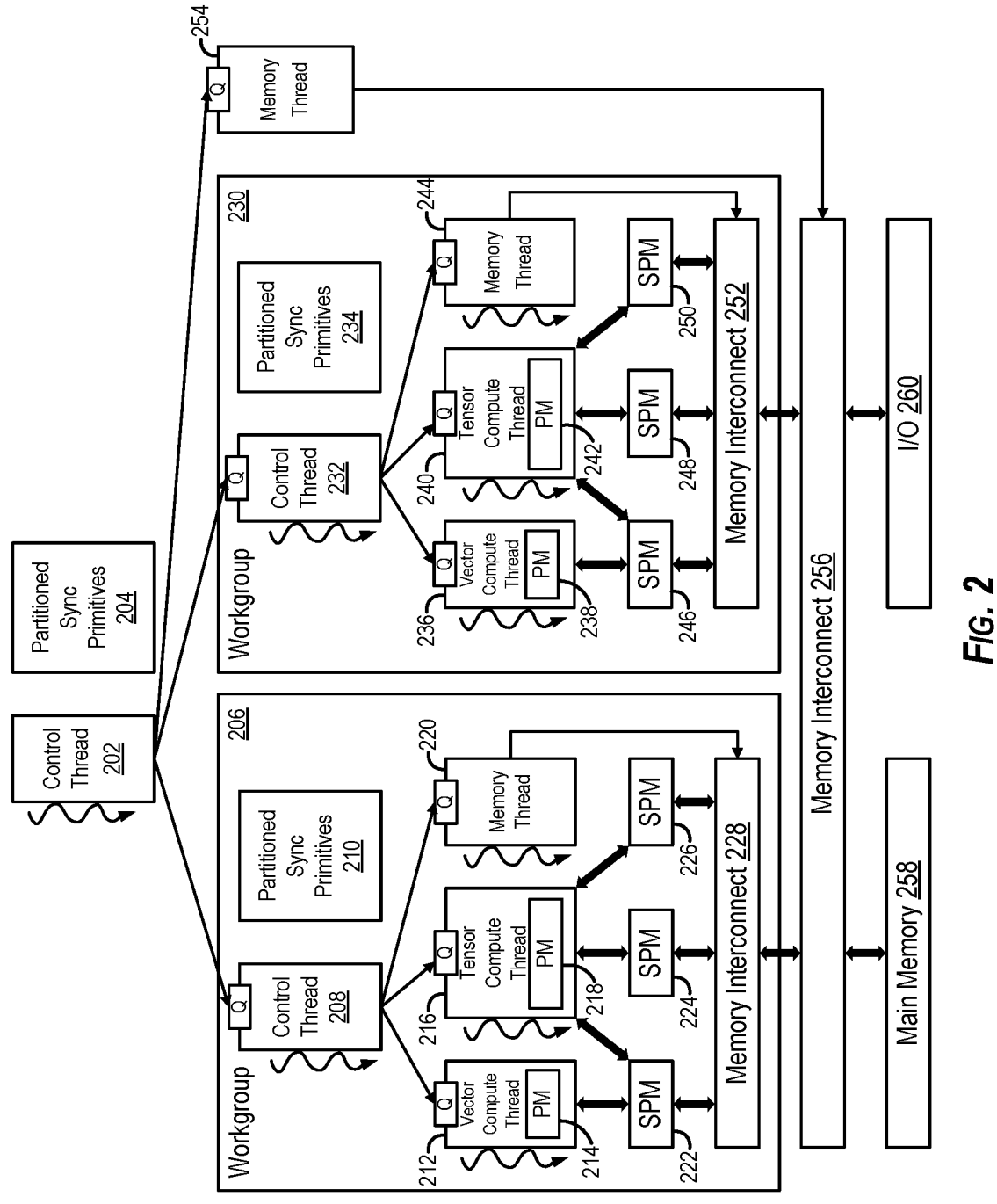
FIG. 2 illustrates an architecture for a two-level control hierarchy according to some embodiments.

FIG. 2 illustrates an architecture 200 for a two-level control hierarchy according to some embodiments. In some embodiments, architecture 200 is implemented on a device (e.g., an AI accelerator). As depicted in FIG. 2, architecture 200 includes control thread 202, partitioned synchronization primitives 204, workgroup 206, workgroup 230, memory thread 254, memory interconnect 256, main memory 258, and I/O interface 260. In some embodiments, architecture 200 is implement in hardware (e.g., FPGAs, ASICs, etc.) while, in other embodiments, architecture 200 is implement in software. In still some embodiments, architecture 200 is implemented by a mix of hardware and software.

Control thread 202 is similar to control thread 105 in that they both are root control threads at the top of the control hierarchy. Here, control thread 202 controls workgroups 206 and 230 via control threads 208 and 232, respectively, as well as memory thread 254. For instance, when control thread 202 receives a particular command (e.g., from a processor included in a device on which architecture 200 is implemented, from another device, etc.), control thread 202 determines a set of commands for implementing the particular command and then generates the set of commands. Then, control thread 202 sends the set of commands to one or more of control thread 208, control thread 232, and memory thread 254 via their respective queues.

Partitioned synchronization primitives 204 provides mechanisms for providing synchronization between workgroup 206, workgroup 232, memory thread 254, and main memory 258. In some embodiments, architecture 200 includes a set of global synchronization primitives (not shown) and partitioned synchronization primitives 204 is a subset of the set of global synchronization primitives. For example, partitioned synchronization primitives 204 can be used for producer-consumer relationships between threads, specifying ordered access to main memory 258 and/or I/O interface 260 by workgroup 206 and workgroup 230, communication over a network with remote devices (e.g., AI accelerators, hosts, etc.), multi-workgroup barriers, debugging breakpoints, etc. Examples of mechanisms for providing synchronization include semaphores, mutexes, monitors, and/or barriers. Methods for implementing synchronization can include point-to-point messages between threads, shared semaphore register banks, and atomic operation. In some embodiments, workgroup 206, workgroup 230, and memory thread 254 execute asynchronously. Therefore, in some such embodiments, when a user wants to synchronize workgroup 206, workgroup 230, and/or memory thread 254 when creating a program for execution by architecture 200, the user explicitly specifies the use of partitioned synchronization primitives 204 in the program.

As mentioned above, a workgroup includes a set of threads and shared memories. As shown in FIG. 2, workgroup 206 includes control thread 208, partitioned synchronization primitives 210, vector compute thread 212, tensor compute thread 216, memory thread 220, SPM 222, SPM 224, SPM 226, and memory interconnect 228.

Control thread 208 is configured to control vector compute thread 212, tensor compute thread 216, and memory thread 220. For instance, when control thread 208 receives a particular command from control thread 202, control thread 208 determines a set of commands for implementing the particular command and generates the set of commands. Control thread 208 then sends the set of commands to one or more of vector compute thread 212, tensor compute thread 216, and memory thread 220 via their respective queues. As an example, control thread 208 can send vector-related commands in the set of commands to vector compute thread 212, tensor-related commands in the set of commands to tensor compute thread 216, and memory-related commands in the set of commands to memory thread 220. In some embodiments, the structure of the commands that control thread 208 determines for each of the vector compute thread 212, tensor compute thread 216, and memory thread 220 can be different and suitable for their respective purposes.

Partitioned synchronization primitives 210 serve to provide mechanisms for providing synchronization between vector compute thread 212, tensor compute thread 216, and memory thread 220. As explained above, architecture 200 includes a set of global synchronization primitives, in some embodiments. In some such embodiments, partitioned synchronization primitives 210 is a subset of the set of global synchronization primitives. For example, partitioned synchronization primitives 210 may be used for producer-consumer relationships between threads, specifying ordered access to SPM 222, SPM 224, and/or SPM 226 by vector compute thread 212, tensor compute thread 216, and/or memory thread 220, communication over a network with remote devices (e.g., AI accelerators, hosts, etc.), multi-workgroup barriers, debugging breakpoints, etc. Examples of mechanisms for providing synchronization include semaphores, mutexes, monitors, and/or barriers. Methods for implementing synchronization can include point-to-point messages between threads, shared semaphore register banks, and atomic operation. In some embodiments, vector compute thread 212, tensor compute thread 216, and memory thread 220 execute asynchronously. Hence, in some such embodiments, when a user wants to synchronize vector compute thread 212, tensor compute thread 216, and/or memory thread 220 when creating a program for execution by architecture 200, the user explicitly specifies the use of partitioned synchronization primitives 210 in the program.

Vector compute thread 212, which includes private memory 214, operates the same as vector compute thread 115 and private memory 120. Similarly, tensor compute thread 216, which includes private memory 218, operates the same as tensor compute thread 125 and private memory 130. Memory thread 220 operates the same as memory thread 135 except memory thread 220 can also access data in the memories of workgroup 230 (e.g., SPM 246, SPM 248, and SPM 250). SPM 222, SPM 224, and SPM 226 operate the same as SPM 140, 145, and 150, respectively. Memory interconnect 228 provides access to SPM 222, SPM 224, SPM 226, and memory interconnect 256.

As depicted in FIG. 2, workgroup 230 includes control thread 232, partitioned synchronization primitives 234, vector compute thread 236, tensor compute thread 240, memory thread 244, SPM 246, SPM 248, SPM 250, and memory interconnect 252. Control thread 232 is configured to control vector compute thread 236, tensor compute thread 240, and memory thread 244. For example, when control thread 232 receives a particular command from control thread 202, control thread 232 determines a set of commands for implementing the particular command and generates the set of commands. Next, control thread 232 sends the set of commands to one or more of vector compute thread 236, tensor compute thread 240, and memory thread 244 via their respective queues. As an example, control thread 232 may send vector-related commands in the set of commands to vector compute thread 236, tensor-related commands in the set of commands to tensor compute thread 240, and memory-related commands in the set of commands to memory thread 244. In some embodiments, the structure of the commands that control thread 232 determines for each of the vector compute thread 236, tensor compute thread 240, and memory thread 244 may be different and suitable for their respective purposes.

Partitioned synchronization primitives 234 provide mechanisms for providing synchronization between vector compute thread 236, tensor compute thread 240, and memory thread 244. As mentioned above, in some embodiments, architecture 200 includes a set of global synchronization primitives. In some such embodiments, partitioned synchronization primitives 234 is a subset of the set of global synchronization primitives. For instance, partitioned synchronization primitives 234 may be used for producer-consumer relationships between threads, specifying ordered access to SPM 222, SPM 224, and/or SPM 226 by vector compute thread 236, tensor compute thread 240, and/or memory thread 244, communication over a network with remote devices (e.g., AI accelerators, hosts, etc.), multi-workgroup barriers, debugging breakpoints, etc. Examples of mechanisms for providing synchronization include semaphores, mutexes, monitors, and/or barriers. Methods for implementing synchronization can include point-to-point messages between threads, shared semaphore register banks, and atomic operation. In some embodiments, vector compute thread 236, tensor compute thread 240, and memory thread 244 execute asynchronously. Hence, in some such embodiments, when a user wants to synchronize vector compute thread 236, tensor compute thread 240, and/or memory thread 244 when creating a program for execution by architecture 200, the user explicitly specifies the use of partitioned synchronization primitives 234 in the program.

Vector compute thread 236, which includes private memory 238, operates the same as vector compute thread 115 and private memory 120. In addition, tensor compute thread 240, which includes private memory 242, operates the same as tensor compute thread 125 and private memory 130. Memory thread 244 operates the same as memory thread 135 except memory thread 244 may also access data in the memories of workgroup 206 (e.g., SPM 222, SPM 224, and SPM 226). SPM 246, SPM 248, and SPM 250 operate the same as SPM 140, 145, and 150, respectively. Memory interconnect 252 provides access to SPM 246, SPM 248, SPM 250, and memory interconnect 256.

Memory thread 254 is responsible for performing memory operations, performing data transformation operations, and facilitating communication of data with other devices. Examples of memory operations include reading data from workgroup 206 (e.g., SPM 222, SPM 224, and SPM 226), workgroup 230 (e.g., SPM 246, SPM 248, and SPM 250), main memory 258, and/or I/O interface 260 as well as writing data to workgroup 206 (e.g., SPM 222, SPM 224, and SPM 226), workgroup 230 (e.g., SPM 246, SPM 248, and SPM 250), main memory 258, and/or I/O interface 260. Examples of data transformation operations include matrix transpose operations, gather and scatter operations, data type and layout changes, etc. Memory thread 254 may facilitate communication of data with other devices by receiving data from and sending data to I/O interface 260. As shown in FIG. 2, memory thread 254 includes a queue (Q) through which memory thread 254 receives commands from control thread 202. As such, when memory thread 254 receives a command in its queue from control thread 202, memory thread 254 executes the command. In some embodiments, memory thread 254 can be programmed to implement a particular command in different ways. In some cases, when memory thread 254 executes a command, it may involve memory thread 254 accessing, via memory interconnect 256, SPM 222, SPM 224, SPM 226, SPM 246, SPM 248, SPM 250, main memory 258, and/or I/O interface 260.

Memory interconnect 256 is configured to provide access to memory interconnect 228, memory interconnect 252, main memory 258, and I/O interface 260. Main memory 258 is memory used by architecture 200 for storing data. I/O interface 260 is an interface for accessing external I/O devices (e.g., a network interface, a component bus interface, etc.).

Figure 3:
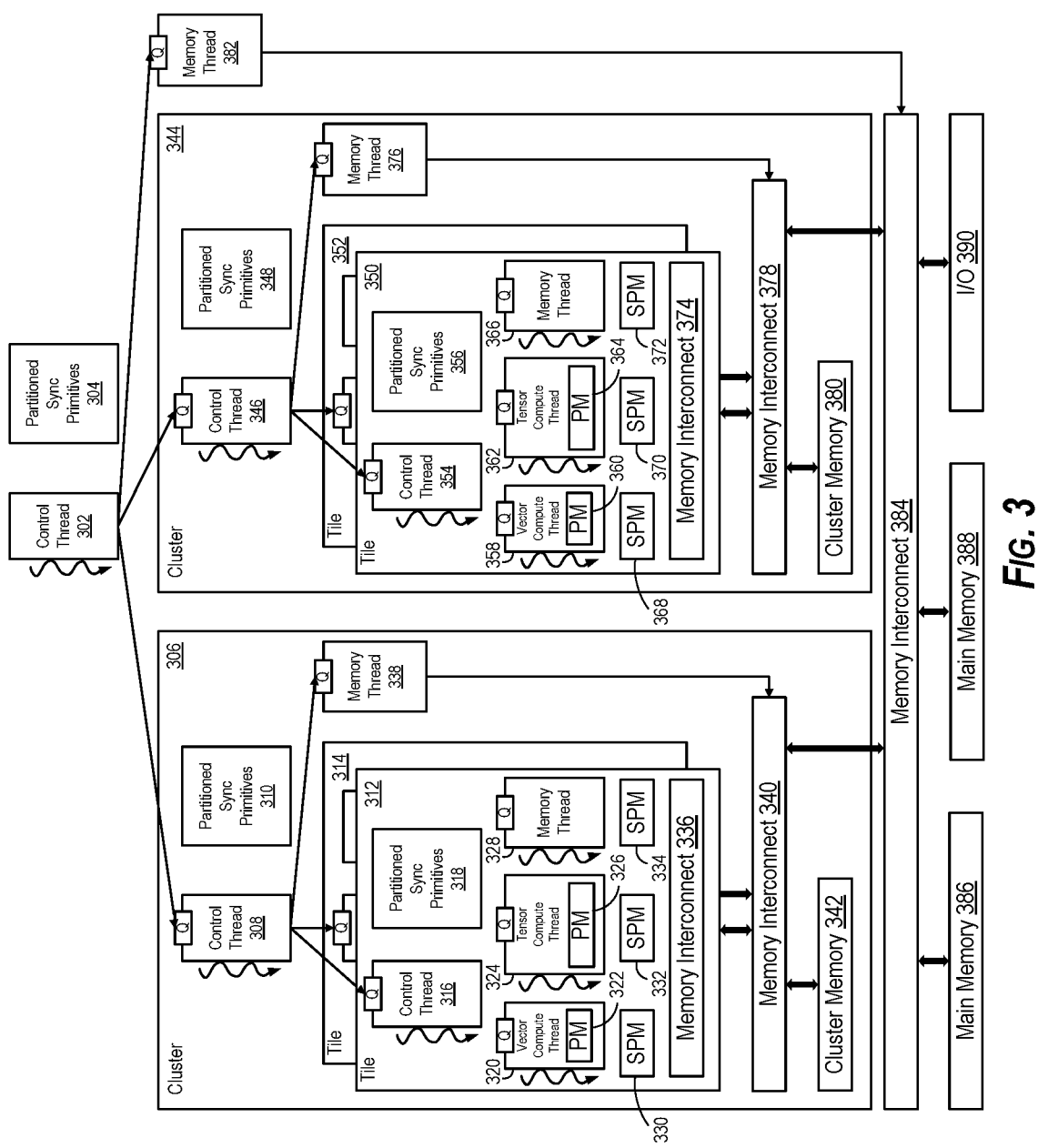
FIG. 3 illustrates an architecture for a three-level control hierarchy according to some embodiments.

FIG. 3 illustrates an architecture 300 for a three-level control hierarchy according to some embodiments. In some embodiments, architecture 300 is implemented on a device (e.g., an AI accelerator). As illustrated in FIG. 3, architecture 300 includes control thread 302, partitioned synchronization primitives 304, cluster 306, cluster 344, memory thread 382, memory interconnect 384, main memories 386 and 388, and I/O interface 390. In some embodiments, architecture 300 is implement in hardware (e.g., FPGAs, ASICs, etc.) while, in other embodiments, architecture 300 is implement in software. In yet some embodiments, architecture 300 is implemented by a mix of hardware and software.

Control thread 302 is similar to control threads 105 and 202 in that they all are root control threads at the top of the control hierarchy. In this example, control thread 302 controls clusters 306 and 342 via control threads 308 and 344, respectively, as well as memory thread 382. For example, when control thread 302 receives a particular command (e.g., from a processor included in a device on which architecture 300 is implemented, from another device, etc.), control thread 302 determines a set of commands for implementing the particular command and generates the set of commands. Control thread 302 then sends the set of commands to one or more of control thread 308, control thread 344, and memory thread 382 via their respective queues.

Partitioned synchronization primitives 304 provides mechanisms for providing synchronization between cluster 306, cluster 344, memory thread 382, and main memories 386 and 388. In some embodiments, architecture 300 includes a set of global synchronization primitives (not shown) and partitioned synchronization primitives 304 is a subset of the set of global synchronization primitives. For instance, partitioned synchronization primitives 304 may be used for producer-consumer relationships between threads, specifying ordered access to main memories 386 and 388 and/or I/O interface 390 by cluster 306 and cluster 344, communication over a network with remote devices (e.g., AI accelerators, hosts, etc.), multi-workgroup barriers, debugging breakpoints, etc. Examples of mechanisms for providing synchronization include semaphores, mutexes, monitors, and/or barriers. Methods for implementing synchronization can include point-to-point messages between threads, shared semaphore register banks, and atomic operation. In some embodiments, cluster 306, cluster 344, and memory thread 382 execute asynchronously. Accordingly, in some such embodiments, when a user wants to synchronize cluster 306, cluster 344, and/or memory thread 382 when creating a program for execution by architecture 300, the user explicitly specifies the use of partitioned synchronization primitives 304 in the program.

As mentioned above, a workgroup includes a set of threads and shared memories. For this example, a cluster is a workgroup that has multiple levels of control hierarchy (two levels in this example) and a tile is a workgroup that has a single level of control hierarchy. As depicted in FIG. 3, cluster 306 includes control thread 308, partitioned synchronization primitives 310, tile 312, tile 314, memory thread 338, memory interconnect 340, and cluster memory 342.

Control thread 308 handles the control of tile 312, tile 314, and memory thread 338. For instance, when control thread 308 receives a particular command from control thread 302, control thread 308 determines a set of commands for implementing the particular command and generates the set of commands. Control thread 308 then sends the set of commands to one or more of tile 312, tile 314, and memory thread 338.

Partitioned synchronization primitives 310 is configured to provide mechanisms for providing synchronization between tile 312, tile 314, memory thread 338, and cluster memory 342. As described above, in some embodiments, architecture 300 includes a set of global synchronization primitives. In some such embodiments, partitioned synchronization primitives 310 is a subset of the set of global synchronization primitives. For instance, partitioned synchronization primitives 310 can be used for producer-consumer relationships between threads, specifying ordered access to cluster memory 342 by tile 312, tile 314, memory thread 338 and/or, and cluster memory 342, communication over a network with remote devices (e.g., AI accelerators, hosts, etc.), multi-workgroup barriers, debugging breakpoints, etc. Examples of mechanisms for providing synchronization include semaphores, mutexes, monitors, and/or barriers. Methods for implementing synchronization can include point-to-point messages between threads, shared semaphore register banks, and atomic operation. In some embodiments, tile 312, tile 314, and memory thread 338 execute asynchronously. As such, in some such embodiments, when a user wants to synchronize tile 312, tile 314, and/or memory thread 338 when creating a program for execution by architecture 300, the user explicitly specifies the use of partitioned synchronization primitives 310 in the program.

As explained above, a tile is a workgroup that has a single level of control hierarchy. The following will describe only how tile 312 operates. While tile 314 will not be described in detail, tile 314 is configured to operate the same or substantially similar to tile 312. As illustrated, tile 312 includes control thread 316, partitioned synchronization primitives 318, vector compute thread 320, tensor computer thread 324, memory thread 328, SPM 330, SPM 332, SPM 334, and memory interconnect 336. Control thread 316 is responsible for controlling vector compute thread 320, tensor compute thread 324, and memory thread 328. For example, when control thread 316 receives a particular command from control thread 308, control thread 316 determines a set of commands for implementing the particular command and then generates the set of commands. Next, control thread 316 sends the set of commands to one or more of vector compute thread 320, tensor compute thread 324, and memory thread 328 via their respective queues. For instance, control thread 316 can send vector-related commands in the set of commands to vector compute thread 320, tensor-related commands in the set of commands to tensor compute thread 324, and memory-related commands in the set of commands to memory thread 328. In some embodiments, the structure of the commands that control thread 316 determines for each of the vector compute thread 320, tensor compute thread 324, and memory thread 328 can be different and suitable for their respective purposes.

Partitioned synchronization primitives 318 provides mechanisms for providing synchronization between vector compute thread 320, tensor compute thread 324, and memory thread 328. As described above, architecture 300 includes a set of global synchronization primitives, in some embodiments. In some such embodiments, partitioned synchronization primitives 318 is a subset of the set of global synchronization primitives. For example, partitioned synchronization primitives 318 may be used for producer-consumer relationships between threads, specifying ordered access to SPM 330, SPM 332, and/or SPM 334 by vector compute thread 320, tensor compute thread 324, and/or memory thread 328, communication over a network with remote devices (e.g., AI accelerators, hosts, etc.), multi-workgroup barriers, debugging breakpoints, etc. Examples of mechanisms for providing synchronization include semaphores, mutexes, monitors, and/or barriers. Methods for implementing synchronization can include point-to-point messages between threads, shared semaphore register banks, and atomic operation. In some embodiments, vector compute thread 320, tensor compute thread 324, and memory thread 328 execute asynchronously. Thus, in some such embodiments, when a user wants to synchronize vector compute thread 320, tensor compute thread 324, and/or memory thread 328 when creating a program for execution by architecture 300, the user explicitly specifies the use of partitioned synchronization primitives 318 in the program.

Vector compute thread 320, which includes private memory 322, operates the same as vector compute thread 115 and private memory 120. Additionally, tensor compute thread 324, which includes private memory 326, operates the same as tensor compute thread 125 and private memory 130. Memory thread 328 operates the same as memory thread 135 except memory thread 328 can also access data in the memories of tile 314 and cluster memory 342. SPM 330, SPM 332, and SPM 334 operate the same as SPM 140,

145, and 150, respectively. Memory interconnect 336 provides access to SPM 330, SPM 332, SPM 334, and memory interconnect 340.

Memory thread 338 is configured to perform memory operations, perform data transformation operations, and facilitate communication of data with other devices. Examples of memory operations include reading data from tile 312 (e.g., SPM 330, SPM 332, and SPM 334), tile 314, cluster memory 342, cluster 344, main memories 386 and 388, and/or I/O interface 390 as well as writing data to tile 312 (e.g., SPM 330, SPM 332, and SPM 334), tile 314, cluster memory 342, cluster 344, main memories 386 and 388, and/or I/O interface 390. Examples of data transformation operations include matrix transpose operations, gather and scatter operations, data type and layout changes, etc. Memory thread 338 can facilitate communication of data with other devices by receiving data from and sending data to I/O interface 390. As shown in FIG. 3, memory thread 338 includes a queue (Q) through which memory thread 338 receives commands from control thread 308. Hence, when memory thread 338 receives a command in its queue from control thread 308, memory thread 338 executes the command. In some embodiments, memory thread 338 can be programmed to implement a particular command in different ways. In some instances, when memory thread 338 executes a command, it may involve memory thread 338 accessing, via memory interconnect 340, SPM 330, SPM 332, SPM 334, SPM 368, SPM 370, SPM 372, cluster memory 342, cluster memory 380, main memories 386 and 388, and/or I/O interface 390. Memory interconnect 340 is configured to provide access to tile 312, tile 314, cluster memory 342, and memory interconnect 384. Cluster memory 342 is memory used by cluster 306 for storing data.

As mentioned above, a cluster is a workgroup that has multiple levels of control hierarchy (two levels in this example) while a tile is a workgroup that has a single level of control hierarchy. As shown in FIG. 3, cluster 344 includes control thread 346, partitioned synchronization primitives 348, tile 350, tile 352, memory thread 376, memory interconnect 378, and cluster memory 380.

Control thread 346 handles the control of tile 350, tile 352, and memory thread 376. For example, when control thread 346 receives a particular command from control thread 302, control thread 346 determines a set of commands for implementing the particular command and generates the set of commands. Next, control thread 346 sends the set of commands to one or more of tile 350, tile 352, and memory thread 376.

Partitioned synchronization primitives 348 is configured to provide mechanisms for providing synchronization between tile 350, tile 352, memory thread 376, and cluster memory 380. As explained above, architecture 300 includes a set of global synchronization primitives, in some embodiments. In some such embodiments, partitioned synchronization primitives 348 is a subset of the set of global synchronization primitives. For example, partitioned synchronization primitives 348 can be used for producer-consumer relationships between threads, specifying ordered access to cluster memory 380 by tile 350, tile 352, memory thread 376 and/or, and cluster memory 380, communication over a network with remote devices (e.g., AI accelerators, hosts, etc.), multi-workgroup barriers, debugging breakpoints, etc. Examples of mechanisms for providing synchronization include semaphores, mutexes, monitors, and/or barriers. Methods for implementing synchronization can include point-to-point messages between threads, shared semaphore register banks, and atomic operation. In some embodiments, tile 350, tile 352, and memory thread 376 execute asynchronously. Therefore, in some such embodiments, when a user wants to synchronize tile 350, tile 352, and/or memory thread 376 when creating a program for execution by architecture 300, the user explicitly specifies the use of partitioned synchronization primitives 348 in the program.

As described above, a tile is a workgroup that has a single level of control hierarchy. The following will describe only how tile 350 operates. While tile 352 will not be described in detail, tile 352 is configured to operate the same or substantially similar to tile 350. As depicted in FIG. 3, tile 350 includes control thread 354, partitioned synchronization primitives 356, vector compute thread 358, tensor computer thread 362, memory thread 366, SPM 368, SPM 370, SPM 372, and memory interconnect 374. Control thread 354 is configured to control vector compute thread 358, tensor compute thread 362, and memory thread 366. For instance, when control thread 354 receives a particular command from control thread 346, control thread 354 determines a set of commands for implementing the particular command and then generates the set of commands. Then, control thread 354 sends the set of commands to one or more of vector compute thread 358, tensor compute thread 362, and memory thread 366 via their respective queues. For instance, control thread 354 can send vector-related commands in the set of commands to vector compute thread 358, tensor-related commands in the set of commands to tensor compute thread 362, and memory-related commands in the set of commands to memory thread 366. In some embodiments, the structure of the commands that control thread 354 determines for each of the vector compute thread 358, tensor compute thread 362, and memory thread 366 may be different and suitable for their respective purposes.

Partitioned synchronization primitives 356 provides mechanisms for providing synchronization between vector compute thread 358, tensor compute thread 362, and memory thread 366. As mentioned above, in some embodiments, architecture 300 includes a set of global synchronization primitives. In some such embodiments, partitioned synchronization primitives 356 is a subset of the set of global synchronization primitives. For instance, partitioned synchronization primitives 356 can be used for producer-consumer relationships between threads, specifying ordered access to SPM 368, SPM 370, and/or SPM 372 by vector compute thread 358, tensor compute thread 362, and/or memory thread 366, communication over a network with remote devices (e.g., AI accelerators, hosts, etc.), multi-workgroup barriers, debugging breakpoints, etc. Examples of mechanisms for providing synchronization include semaphores, mutexes, monitors, and/or barriers. Methods for implementing synchronization can include point-to-point messages between threads, shared semaphore register banks, and atomic operation. In some embodiments, vector compute thread 358, tensor compute thread 362, and memory thread 366 execute asynchronously. Accordingly, in some such embodiments, when a user wants to synchronize vector compute thread 358, tensor compute thread 362, and/or memory thread 366 when creating a program for execution by architecture 300, the user explicitly specifies the use of partitioned synchronization primitives 356 in the program.

Vector compute thread 358, which includes private memory 360, operates the same as vector compute thread 115 and private memory 120. Also, tensor compute thread 362, which includes private memory 364, operates the same as tensor compute thread 125 and private memory 130. Memory thread 366 operates the same as memory thread

135 except memory thread 366 may also access data in the memories of tile 352 and cluster memory 380. SPM 368, SPM 370, and SPM 372 operate the same as SPM 140, 145, and 150, respectively. Memory interconnect 374 provides access to SPM 368, SPM 370, SPM 372, and memory interconnect 378.

Memory thread 376 serves to perform memory operations, perform data transformation operations, and facilitate communication of data with other devices. Examples of memory operations include reading data from tile 350 (e.g., SPM 368, SPM 370, and SPM 372), tile 352, cluster memory 380, cluster 306, main memories 386 and 388, and/or I/O interface 390 as well as writing data to tile 350 (e.g., SPM 368, SPM 370, and SPM 372), tile 352, cluster memory 380, cluster 306, main memories 386 and 388, and/or I/O interface 390. Examples of data transformation operations include matrix transpose operations, gather and scatter operations, data type and layout changes, etc. Memory thread 376 may facilitate communication of data with other devices by receiving data from and sending data to I/O interface 390. As illustrated in FIG. 3, memory thread 376 includes a queue (Q) through which memory thread 376 receives commands from control thread 346. Thus, when memory thread 376 receives a command in its queue from control thread 346, memory thread 376 executes the command. In some embodiments, memory thread 376 may be programmed to implement a particular command in different ways. In some cases, when memory thread 376 executes a command, it may involve memory thread 376 accessing, via memory interconnect 374, SPM 330, SPM 332, SPM 334, SPM 368, SPM 370, SPM 372, cluster memory 342, cluster memory 380, main memories 386 and 388, and/or I/O interface 390. Memory interconnect 378 is configured to provide access to tile 350, tile 352, cluster memory 380, and memory interconnect 384. Cluster memory 380 is memory used by cluster 344 for storing data.

Memory thread 382 is responsible for performing memory operations, performing data transformation operations, and facilitating communication of data with other devices. Examples of memory operations include reading data from cluster 306 (e.g., tile 312 and tile 314), cluster 344 (e.g., tile 350 and tile 352), main memories 386 and 388, and/or I/O interface 390 as well as writing data to cluster 306 (e.g., tile 312 and tile 314), cluster 344 (e.g., tile 350 and tile 352), main memories 386 and 388, and/or I/O interface 390. Examples of data transformation operations include matrix transpose operations, gather and scatter operations, data type and layout changes, etc. Memory thread 382 can facilitate communication of data with other devices by receiving data from and sending data to I/O interface 260. As shown in FIG. 3, memory thread 382 includes a queue (Q) through which memory thread 382 receives commands from control thread 302. Hence, when memory thread 382 receives a command in its queue from control thread 302, memory thread 382 executes the command. In some embodiments, memory thread 382 may be programmed to implement a particular command in different ways. In some cases, when memory thread 382 executes a command, it may involve memory thread 382 accessing, via memory interconnect 384, memory interconnect 340, and/or memory interconnect 378, SPM 330, SPM 334, SPM 336, SPM 368, SPM 370, SPM 372, main memories 386 and 388, and/or I/O interface 390.

Memory interconnect 384 is responsible for providing access to memory interconnect 340, memory interconnect 378, main memories 386 and 388, and I/O interface 390. Main memories 386 and 388 are memory used by architecture 300 for storing data. I/O interface 390 is an interface for accessing external I/O devices (e.g., a network interface, a component bus interface, etc.).

FIGS. 1-3 illustrates example architectures with control hierarchies that have different number of levels. At the lowest level in each of the control hierarchies is a set of workgroups that each includes a vector compute thread, a tensor compute thread, and a memory thread. One of ordinary skill in the art will appreciate that additional and/or different types of threads may be included in a workgroup. For example, a workgroup can include a networking thread configured for performing networking operations (e.g., processing packets, forwarding packets, etc.), an encryption thread configured to perform encryption operations, a decryption thread configured to perform decryption operations, a compression thread configured to perform data compression operations, a decompression thread configured to perform data decompression operations, etc. In addition, different workgroups may include different sets of threads. For instance, a first workgroup in an architecture can include a vector compute thread, a tensor compute thread, and a memory thread while a second workgroup in the architecture can include a networking thread, a compression thread, and a decompression thread.

FIG. 4 illustrates a process 400 for programming AI hardware according to some embodiments. In some embodiments, a user creating a program using a hierarchical programming model for AI hardware can perform process 400. Process 400 begins by programing, at 410, a higher-level control thread to, upon receiving a command from a device, generate a set of commands based on the command. Referring to FIG. 2 as an example, a user can program control thread 202 to determine a set of commands upon receiving the command from a device on which architecture 200 is implemented and then generate the set of commands.

Next, process 400 programs, at 420, the higher-level control thread to provide the set of commands to a subset of a set of lower-level control threads. Referring to FIG. 2 as an example, a user may program control thread 202 to send the generated set of commands to control thread 208, control thread 232, and/or memory thread 254. In turn, control thread 208 and/or control thread 232 can generate sets of commands based on the commands they received and then send their generated sets of commands to one or more of vector compute thread 212, tensor compute thread 216, memory thread 220, vector compute thread 236, tensor compute thread 240, and/or memory thread 244.

Finally, process 400 programs, at 430, a lower-level control thread in the subset of the set of lower-level control threads to instruct, based on a particular command in the set of commands, a subset of a plurality of processing threads to perform a set of operations. Referring to FIG. 2 as an example, a user can program control thread 208 and/or 232 to generate sets of commands based on the commands they received from control thread 202, as mentioned above. The sets of command that control thread 208 and/or control thread 232 generates instruct one or more of vector compute thread 212, tensor compute thread 216, memory thread 220, vector compute thread 236, tensor compute thread 240, and/or memory thread 244 to implement the sets of commands.

The techniques describe above may be implemented in a wide range of computer systems configured to process neural networks. FIG. 5 depicts a simplified block diagram of an example computer system 500, which can be used to implement the techniques described in the foregoing disclosure. As shown in FIG. 5, computer system 500 includes one or more processors 502 that communicate with a number of peripheral devices via a bus subsystem 504. These peripheral devices may include a storage subsystem 506 (e.g., comprising a memory subsystem 508 and a file storage subsystem 510) and a network interface subsystem 516. Some computer systems may further include user interface input devices 512 and/or user interface output devices 514.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Embodiments of network interface subsystem 516 can include, e.g., Ethernet, a Wi-Fi and/or cellular adapter, a modem (telephone, satellite, cable, ISDN, etc.), digital subscriber line (DSL) units, and/or the like.

Storage subsystem 506 includes a memory subsystem 508 and a file/disk storage subsystem 510. Subsystems 508 and 510 as well as other memories described herein are examples of non-transitory computer-readable storage media that can store executable program code and/or data that provide the functionality of embodiments of the present disclosure.

Memory subsystem 508 includes a number of memories including a main random access memory (RAM) 518 for storage of instructions and data during program execution and a read-only memory (ROM) 520 in which fixed instructions are stored. File storage subsystem 510 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and many other configurations having more or fewer components than system 500 are possible.

FIG. 6 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 602, which may comprise architectures illustrated in FIG. 5 above, may be coupled to a plurality of controllers 610(1)-610(M) over a communication network 601 (e.g., switches, routers, etc.). Controllers 610(1)-610(M) may also comprise architectures illustrated in FIG. 5 above. Each controller 610(1)-610(M) may be coupled to one or more NN processors, such as processors 611(1)-611(N) and 612(1)-612(N), for example. NN processors 611(1)-611(N) and 612(1)-612(N) may include a variety of configurations of functional processing blocks and memory optimized for neural network processing, such as training or inference. The NN processors are optimized for neural network computations. In some embodiments, any of the architectures shown in FIGS. 1-3 may be used to implement NN processors 611(1)-611(N) and 612(1)-612 (N). Server 602 may configure controllers 610 with NN models as well as input data to the models, which may be loaded and executed by NN processors 611(1)-611(N) and 612(1)-612(N) in parallel, for example. Models may include layers and associated weights as described above, for example. NN processors may load the models and apply the inputs to produce output results. NN processors may also implement training algorithms described herein, for example.

FURTHER EXAMPLE EMBODIMENTS

In various embodiments, the present disclosure includes systems, methods, and apparatuses for providing a hierarchical programming model for AI hardware. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising a set of lower-level control threads and a higher-level control thread configured to receive a command from a device, generate a set of commands based on the command, and provide the set of commands to a subset of the set of lower-level control threads, wherein a lower-level control thread in the subset of the set of lower-level control threads is configured to instruct, based on a particular command in the set of commands, a subset of a plurality of processing threads to perform a set of operations.

In one embodiment, the higher-level control thread provides the set of commands to the set of lower-level control threads by sending each command in the set of commands to a lower-level control thread in the subset of the set of lower-level control threads. The lower-level control thread in the subset of the set of lower-level control threads is further configured to receive, from the higher-level control thread, the particular command in the set of commands.

In one embodiment, the set of commands is a first set of commands. The system further comprises a set of mid-level control threads, wherein the higher-level control thread provides the first set of commands to the set of lower-level control threads by sending each command in the first set of commands to a mid-level control thread in subset of the set of mid-level control threads, wherein each mid-level control thread in the subset of the set of mid-level control threads is configured to receive a command in the first set of commands, generate a second set of commands, and send each command in the second set of commands to a lower-level control thread in the set of lower-level control threads.

In one embodiment, the set of operations comprises a set of data transformations operations.

In one embodiment, the set of operations comprises a set of memory access operations.

In one embodiment, a processing thread in the plurality of processing threads is a memory access thread.

In one embodiment, the set of operations comprises a set of compute operations.

In one embodiment, a processing thread in the plurality of processing threads is a compute thread.

In one embodiment, the compute thread is a vector compute thread configured to perform element-wise operations.

In one embodiment, the compute thread is a tensor compute thread configured to perform matrix multiplication operations.

In one embodiment, the present disclosure includes a first device comprising a set of lower-level control threads; and a higher-level control thread configured to receive a command from a second device, generate a set of commands based on the command, and provide the set of commands to a subset of the set of lower-level control threads, wherein a lower-level control thread in the subset of the set of lower-level control threads is configured to instruct, based on a particular command in the set of commands, a subset of a plurality of processing threads to perform a set of operations.

In one embodiment, the present disclosure includes a method comprising programing a higher-level control thread to, upon receiving a command from the device, generate a set of commands based on the command; programming the higher-level control thread to provide the set of commands to a subset of a set of lower-level control threads; and programming a lower-level control thread in the subset of the set of lower-level control threads to instruct, based on a particular command in the set of commands, a subset of a plurality of processing threads to perform a set of operations.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
one or more processors;
a memory;
a set of lower-level control threads stored in the memory and executable by the one or more processors; and
a higher-level control thread stored in the memory and executed by the one or more processors, the higher-level control thread receiving a first command from a device, generating a set of second commands based on the first command for implementing the first command, and providing the set of second commands to a subset of the set of lower-level control threads, wherein generating the set of second commands based on the first command includes selecting the subset of the set of lower-level control threads in accordance with types of the set of second commands,
wherein a lower-level control thread in the subset of the set of lower-level control threads instructs, based on a particular second command of the set of second commands, a subset of a plurality of processing threads to perform a set of operations for implementing the particular second command, the plurality of processing threads being separate and distinct from the higher-level control thread and the set of lower-level control threads, the subset of the plurality of processing threads including at least a memory thread that exclusively performs memory access operations and one or more compute threads that exclusively perform compute operations, wherein synchronization is provided between the one or more compute threads and the memory thread.

2. The system of claim 1, wherein the higher-level control thread provides the set of second commands to the set of lower-level control threads by sending each second command in the set of second commands to a lower-level control thread in the subset of the set of lower-level control threads, wherein the lower-level control thread in the subset of the set of lower-level control threads is further configured to receive, from the higher-level control thread, the particular second command in the set of second commands.

3. The system of claim 1, wherein the set of second commands is a first set of second commands, wherein the system further comprises a set of mid-level control threads, wherein the higher-level control thread provides the first set of second commands to the set of lower-level control threads by sending each second command in the first set of second commands to a mid-level control thread in a subset of the set of mid-level control threads, wherein each mid-level control thread in the subset of the set of mid-level control threads is configured to receive a second command in the first set of second commands, generate a second set of second commands, and send each second command in the second set of second commands to a lower-level control thread in the set of lower-level control threads.

4. The system of claim 1, wherein the set of operations comprises a set of data transformations operations.

5. The system of claim 1, wherein the set of operations comprises a set of memory access operations.

6. The system of claim 5, wherein a processing thread in the plurality of processing threads is a memory access thread.

7. The system of claim 1, wherein the set of operations comprises a set of compute operations.

8. The system of claim 1, wherein the one or more compute threads include a vector compute thread configured to perform element-wise operations.

9. The system of claim 1, wherein the one or more compute threads include a tensor compute thread configured to perform matrix multiplication operations.

10. The system of claim 1, wherein instructing, based on the particular second command of the set of second commands, the subset of a plurality of processing threads to perform the set of operations includes selecting the subset of the plurality of the processing threads in accordance with operation types of the set of operations.

11. A first device, comprising:
a memory storing computer-executable program instructions including a higher-level control thread, a set of lower-level control threads, and a plurality of processing threads; and
a processor executing the computer-executable program instructions stored in the memory to cause the higher-level control thread to receive a first command from a second device, generate a set of second commands based on the first command for implementing the first command, and provide the set of second commands to a subset of the set of lower-level control threads, wherein generating the set of second commands based on the first command includes selecting the subset of the set of lower-level control threads in accordance with types of the set of second commands,
the processor further executing the computer-executable program instructions stored in the memory to cause the lower-level control thread in the subset of the set of lower-level control threads to instruct, based on a particular second command of the set of second commands, a subset of a plurality of processing threads to perform a set of operations for implementing the particular second command, the plurality of processing threads being separate and distinct from the higher-level control thread and the set of lower-level control threads, the subset of the plurality of processing threads including at least a memory thread that exclusively performs memory access operations and one or more compute threads that exclusively perform compute operations, wherein synchronization is provided between the one or more compute threads and the memory thread.

12. The first device of claim 11, wherein the higher-level control thread provides the set of second commands to the set of lower-level control threads by sending each second command in the set of second commands to a lower-level control thread in the subset of the set of lower-level control threads, wherein the lower-level control thread in the subset of the set of lower-level control threads is further configured to receive, from the higher-level control thread, the particular second command in the set of second commands.

13. The first device of claim 11, wherein the set of second commands is a first set of second commands, wherein the computer-executable program instructions further include a set of mid-level control threads, wherein the processor is further configured to execute the computer-executable program instructions stored in the memory to cause the higher-level control thread to provide the first set of second commands to the set of lower-level control threads by sending each second command in the first set of second commands to a mid-level control thread in subset of the set of mid-level control threads, wherein the processor is further configured to execute the computer-executable program instructions stored in the memory to cause each mid-level control thread in the subset of the set of mid-level control threads to receive a second command in the first set of second commands, generate a second set of second commands, and send each second command in the second set of second commands to a lower-level control thread in the set of lower-level control threads.

14. The first device of claim 11, wherein the set of operations comprises a set of data transformations operations.

15. The first device of claim 11, wherein the set of operations comprises a set of memory access operations.

16. The first device of claim 15, wherein a processing thread in the plurality of processing threads is a memory access thread.

17. The first device of claim 11, wherein the set of operations comprises a set of compute operations.

18. The first device of claim 11, wherein the one or more compute threads include a vector compute thread configured to perform element-wise operations.

19. A method comprising:
executing a higher-level control thread to generate, upon receiving a first command from a device, a set of second commands based on the first command for implementing the first command wherein generating the set of second commands based on the first command includes selecting a subset of a set of lower-level control threads in accordance with types of the set of second commands;

executing the higher-level control thread to provide the set of second commands to the subset of the set of lower-level control threads; and executing a lower-level control thread in the subset of the set of lower-level control threads to instruct, based on a particular second command of the set of second commands, a subset of a plurality of processing threads to execute a set of operations for implementing the particular second command, the plurality of processing threads being separate and distinct from the higher-level control thread and the set of lower-level control threads, the subset of the plurality of processing threads including at least a memory thread that exclusively executes memory access operations and one or more compute threads that exclusively execute compute operations, wherein synchronization is provided between the one or more compute threads and the memory thread.

* * * * *